United States Patent
Sato

(10) Patent No.: US 11,527,041 B2
(45) Date of Patent: Dec. 13, 2022

(54) INFORMATION PROCESSING APPARATUS, INFORMATION PROCESSING METHOD AND STORAGE MEDIUM

(71) Applicant: CANON KABUSHIKI KAISHA, Tokyo (JP)

(72) Inventor: Tomokazu Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/740,982

(22) Filed: Jan. 13, 2020

(65) Prior Publication Data

US 2020/0242837 A1 Jul. 30, 2020

(30) Foreign Application Priority Data

Jan. 24, 2019 (JP) .............................. JP2019-010058

(51) Int. Cl.
 *G06T 17/20* (2006.01)
(52) U.S. Cl.
 CPC .................................. *G06T 17/205* (2013.01)
(58) Field of Classification Search
 CPC .................................................... G06T 17/205
 See application file for complete search history.

(56) References Cited

U.S. PATENT DOCUMENTS

| | | | | |
|---|---|---|---|---|
| 5,963,209 A | * | 10/1999 | Hoppe | G06T 17/20 345/419 |
| 6,191,796 B1 | * | 2/2001 | Tarr | G06F 3/014 345/581 |
| 6,879,324 B1 | * | 4/2005 | Hoppe | G06T 17/20 345/419 |
| 9,602,842 B2 | | 3/2017 | Matsui et al. | |
| 2001/0013866 A1 | * | 8/2001 | Migdal | G06T 17/20 345/428 |
| 2002/0130867 A1 | * | 9/2002 | Yang | G06T 17/20 345/428 |
| 2004/0249617 A1 | * | 12/2004 | Lau | H04N 19/423 703/2 |
| 2006/0132488 A1 | * | 6/2006 | Lim | G06T 17/20 345/428 |
| 2012/0182298 A1 | * | 7/2012 | Sun | G06T 17/05 345/423 |
| 2016/0358375 A1 | * | 12/2016 | Lacey | G06T 17/205 |
| 2019/0279422 A1 | * | 9/2019 | Hemmer | G06T 17/20 |

FOREIGN PATENT DOCUMENTS

| | | |
|---|---|---|
| JP | 2000092487 A | 3/2000 |
| JP | 2007265459 A | 10/2007 |

OTHER PUBLICATIONS

Notice of Reasons for Refusal issued by the Japan Patent Office dated Nov. 1, 2022 in corresponding JP Patent Application No. 2019-010058, with English translation.

\* cited by examiner

*Primary Examiner* — Phi Hoang
(74) *Attorney, Agent, or Firm* — Carter, DeLuca & Farrell LLP

(57) ABSTRACT

The information processing apparatus (encoding apparatus) that acquires first polygon data representing a shape of an object, acquires geometry data relating to geometry of second polygon data whose resolution is higher than that of the first polygon data, and outputs encoded data including the geometry data and topology data relating to the first polygon data.

15 Claims, 15 Drawing Sheets

| VERTEX COORDINATES | |
|---|---|
| V0 | x0,y0,z0 |
| V1 | x1,y1,z1 |
| V2 | x2,y2,z2 |
| V3 | x3,y3,z3 |

| TRIANGLE | |
|---|---|
| T0 | V0,V2,V3 |
| T1 | V0,V3,V1 |

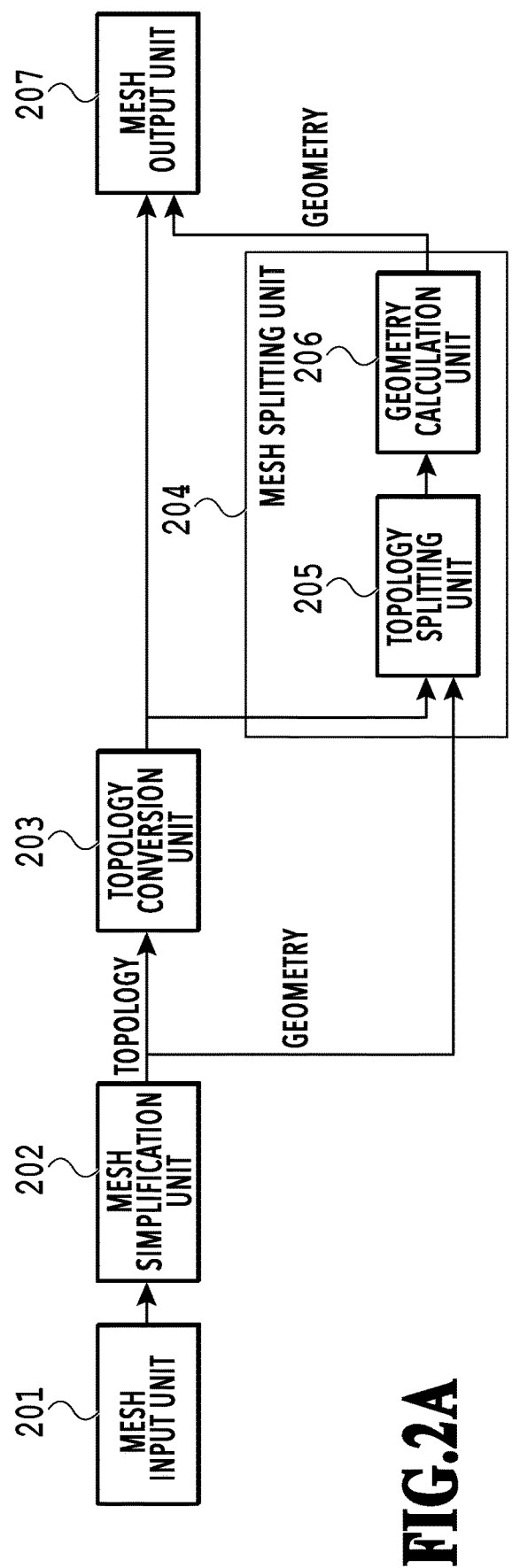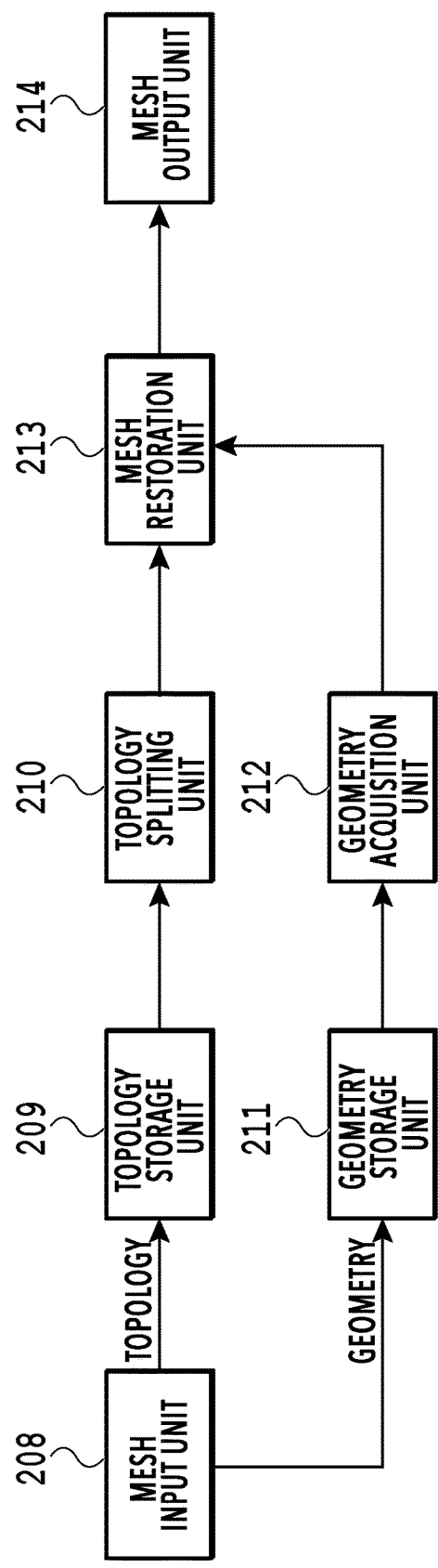
FIG.2A
FIG.2B

| VERTEX COORDINATES | |
|---|---|
| V0 | x0,y0,z0 |
| V1 | x1,y1,z1 |
| V2 | x2,y2,z2 |
| V3 | x3,y3,z3 |

| EDGE | |
|---|---|
| E0 | V0,V1 |
| E1 | V0,V2 |
| E2 | V0,V3 |
| E3 | V2,V3 |
| E4 | V1,V3 |

| TRIANGLE | |
|---|---|
| T0 | E1,E2,E3 |
| T1 | E2,E0,E4 |

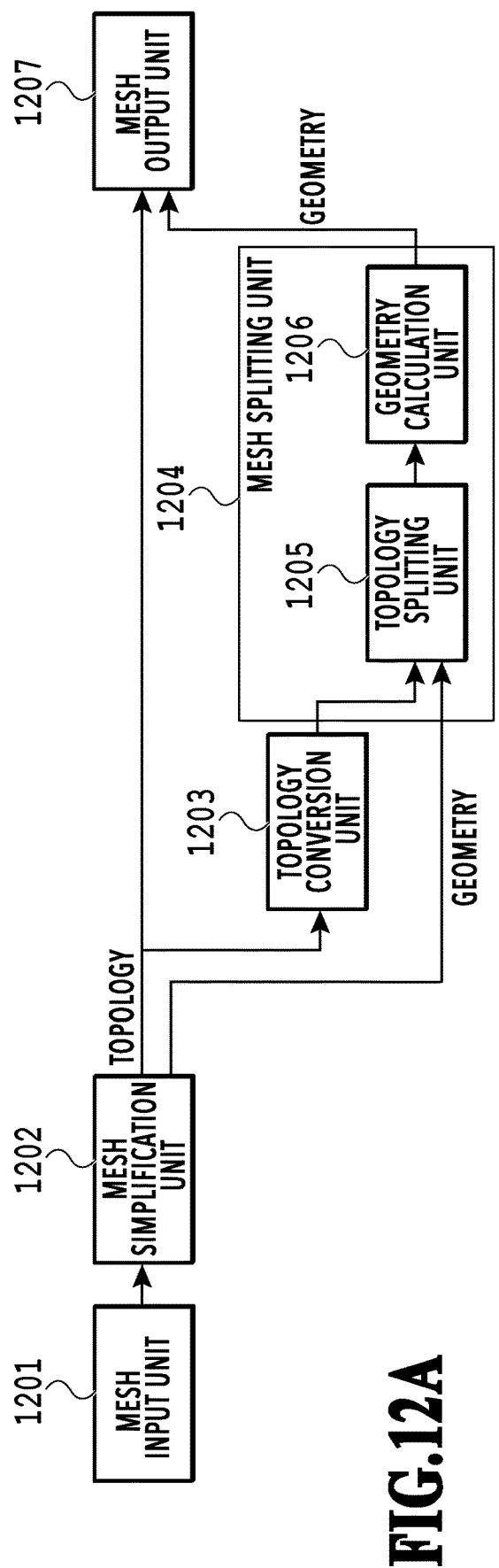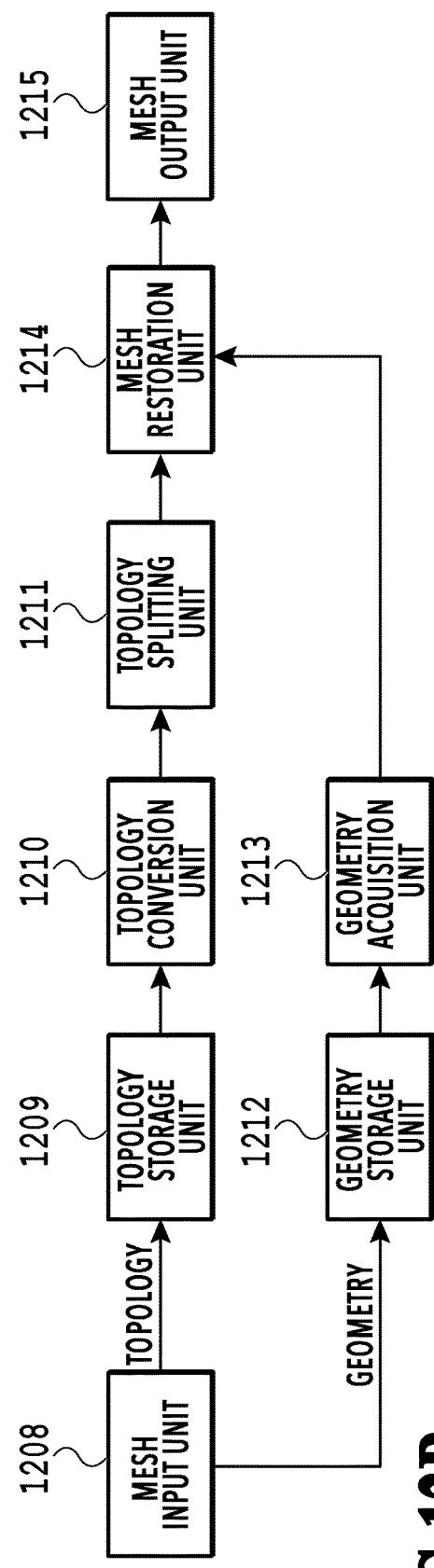
FIG.12A
FIG.12B

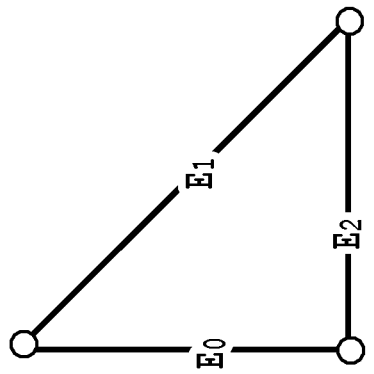
FIG.13A
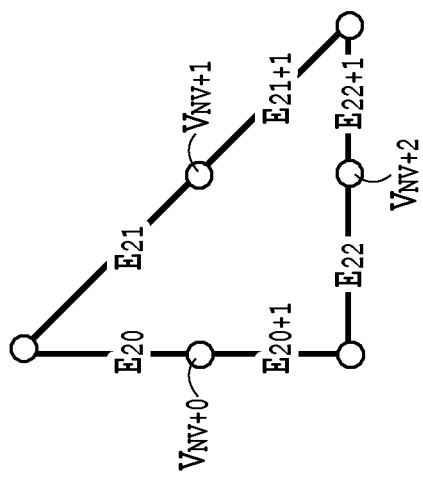
FIG.13B
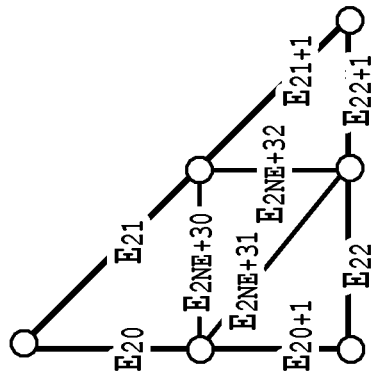
FIG.13C
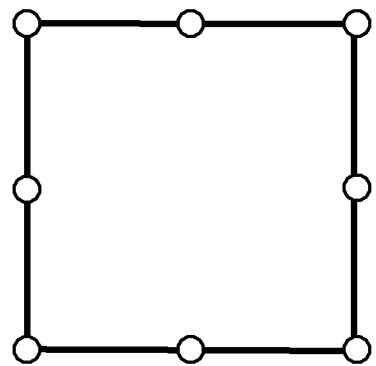
FIG.13D
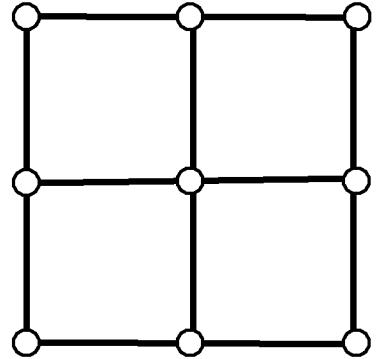
FIG.13E
FIG.13F

INFORMATION PROCESSING APPARATUS, INFORMATION PROCESSING METHOD AND STORAGE MEDIUM

BACKGROUND

Field

The present disclosure relates to an information processing apparatus, an information processing method, and a storage medium.

Description of the Related Art

Conventionally, as a method of data representation of three-dimensional information, a method that uses a surface model (mesh model) by a polygon mesh is known. However, in this method, for example, in a case where drawing of a polygon mesh is performed by using a web browser, or the like, there is a possibility that drawing resources are limited.

Consequently, drawing of high-resolution mesh data is performed by transferring and drawing low-resolution mesh data first and then transferring additional detailed information later by applying a progressive encoding scheme capable of stepwise decoding a polygon mesh from a low resolution to a high resolution.

Japanese Patent Laid-Open No. 2007-265459 has disclosed a method of restoring an original mesh by generating a mesh simplified by repeating processing to integrate two vertices of the mesh into one vertex at the time of encoding and a tree structure that manages the procedure thereof and reversely tracking the tree structure from the simplified mesh at the time of decoding.

However, with the method described in Japanese Patent Laid-Open No. 2007-265459, in a case where the original mesh is restored, the processing to decode vertices one by one by sequentially tracking the tree structure is necessary, and therefore, there is such a problem that the decoding processing takes time. Among others, in a case where a number of high-density meshes are drawn or the like, the decoding time lengthens.

The present disclosure has been made in view of the above-described conventional problem and an object thereof is to reduce the processing amount relating to decoding in the progressive encoding scheme that encodes a polygon mesh so that the resolution of the polygon mesh can be decoded stepwise.

SUMMARY

The present disclosure is an information processing apparatus having: a first acquisition unit configured to acquire first polygon data representing a shape of an object; a second acquisition unit configured to acquire first information indicating positions of vertices of a polygon configuring second polygon data whose resolution is higher than that of the first polygon data; and an output unit configured to output the first information and second information indicating a connection relationship of vertices of a polygon configuring the first polygon data.

Further features of the present disclosure will become apparent from the following description of exemplary embodiments with reference to the attached drawings.

BRIEF DESCRIPTION OF THE DRAWINGS

FIG. 2A is a diagram showing a function configuration of an encoding unit of a progressive encoding apparatus;

FIG. 2B is a diagram showing a function configuration of a decoding unit of the progressive encoding apparatus;

FIG. 12A is a diagram showing a function configuration of the encoding unit of the progressive encoding apparatus;

FIG. 12B is a diagram showing a function configuration of the decoding unit of the progressive encoding apparatus;

FIG. 13A to FIG. 13C are diagrams showing splitting of a triangular mesh; and

FIG. 13D to FIG. 13F are diagrams showing splitting of a rectangular mesh.

DESCRIPTION OF THE EMBODIMENTS

In the following, embodiments of the present disclosure are explained with reference to the drawings. The following embodiments are not intended to limit the present disclosure and all combinations of features explained in the present embodiments are not necessarily indispensable to the solution of the present disclosure. In addition, a variety of aspects within the scope not deviating from the gist of the present disclosure are also included in the present disclosure and it is also possible to appropriately combine part of the following embodiments. In addition, in the following embodiments, explanation is given on the assumption that the apparatus configuration includes both the functions of the encoding unit and the decoding unit, but a configuration may be accepted that has only one of the functions of the encoding unit and the decoding unit.

First Embodiment

Figures 1A, 1B, 1C:
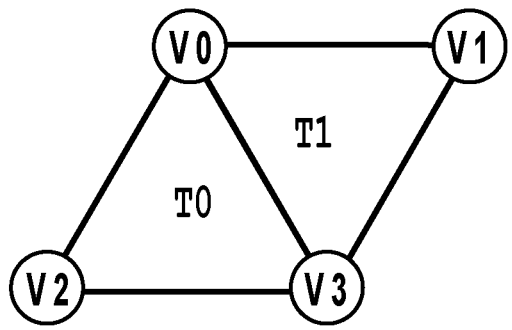
FIG. 1A to FIG. 1C are diagrams showing mesh data described in an existing data description format.

First, before explaining the present embodiment, an existing mesh data description method is explained by using FIG. 1A to FIG. 1C for a comparison with a mesh data description method (data description format) used in the present embodiment. FIG. 1A to FIG. 1C are diagrams showing mesh data described in the existing data description format.

FIG. 1A shows a mesh including a triangle T0 configured by a vertex V0, a vertex V2, and a vertex V3 and a triangle T1 configured by the vertex V0, the vertex V3, and a vertex V1. The mesh such as this is defined by describing the vertex coordinates of each vertex shown in FIG. 1B and a reference to the vertices configuring each triangle shown in FIG. 1C.

The reference to the vertices indicates (describes) the order (index) of the vertices on the data, but the connection relationship between each element only needs to be indicated by a method capable of accessing the vertex coordinates and in addition, there is case where the connection relationship is described by an address on a memory. Further, the information representing a position in a three-dimensional space as shown in FIG. 1B is referred to as geometry and the information representing the connection relationship between each element as shown in FIG. 1C is referred to as topology. In addition, in the following, the above-described data description format is referred to as an existing data description format.

Next, as the information processing apparatus (encoding apparatus) according to the present embodiment, a progressive encoding apparatus capable of decoding a mesh at a high speed is explained and in addition thereto, the data description format of a mesh generated by the progressive encoding apparatus is explained.

FIG. 2A and FIG. 2B are diagrams showing the function configuration of the progressive encoding apparatus. FIG. 2A shows the encoding unit and FIG. 2B shows the decoding unit. In the following, explanation is given in order. The encoding unit shown in FIG. 2A performs progressive encoding for the mesh represented in the existing data description format shown in FIG. 1B and FIG. 1C described above so that it is possible to control resolution stepwise. The progressive encoding in the present embodiment is an encoding scheme of performing encoding so that a three-dimensional mesh model of a polygon mesh can be decoded with a plurality of resolutions (densities) (so that decoding is possible by selecting one of the plurality of resolutions (each resolution)). That is, the encoding apparatus in the present embodiment functions as an information processing apparatus that outputs encoded data (progressive mesh data) capable of decoding a polygon mesh with a plurality of resolutions.

As shown in FIG. 2A, the encoding unit comprises a mesh input unit 201, a mesh simplification unit 202, a topology conversion unit 203, a mesh splitting unit 204, and a mesh output unit 207. Further, the mesh splitting unit 204 has a topology splitting unit 205 and a geometry calculation unit 206.

The mesh input unit 201 receives (acquires) mesh data representing a polygon mesh described in the existing data description format (specifically, the data description format shown in FIG. 1B and FIG. 1C) and inputs the mesh data into the progressive encoding apparatus. The mesh simplification unit 202 simplifies the mesh of the input mesh data. In the following, this simplified mesh is referred to as a base mesh.

The topology conversion unit 203 converts the base mesh into a progressive representation. The progressive representation will be described later by using FIG. 4A to FIG. 4D. The mesh splitting unit 204 repeatedly performs splitting of the topology of the base mesh converted into a progressive representation and fitting to the mesh (hereinafter, referred to as input mesh) to which vertex coordinates are input. Due to this, the mesh splitting unit 204 generates a mesh in the final hierarchy (hereinafter, referred to as full mesh). The mesh output unit 207 outputs the topology of the base mesh of the progressive representation generated in the topology conversion unit 203 and the geometry of the full mesh generated by in mesh splitting unit 204 as a progressively represented mesh. In the following, the mesh data progressively represented, which is output by the mesh output unit 207 is referred to as progressive mesh data.

Figure 3A:
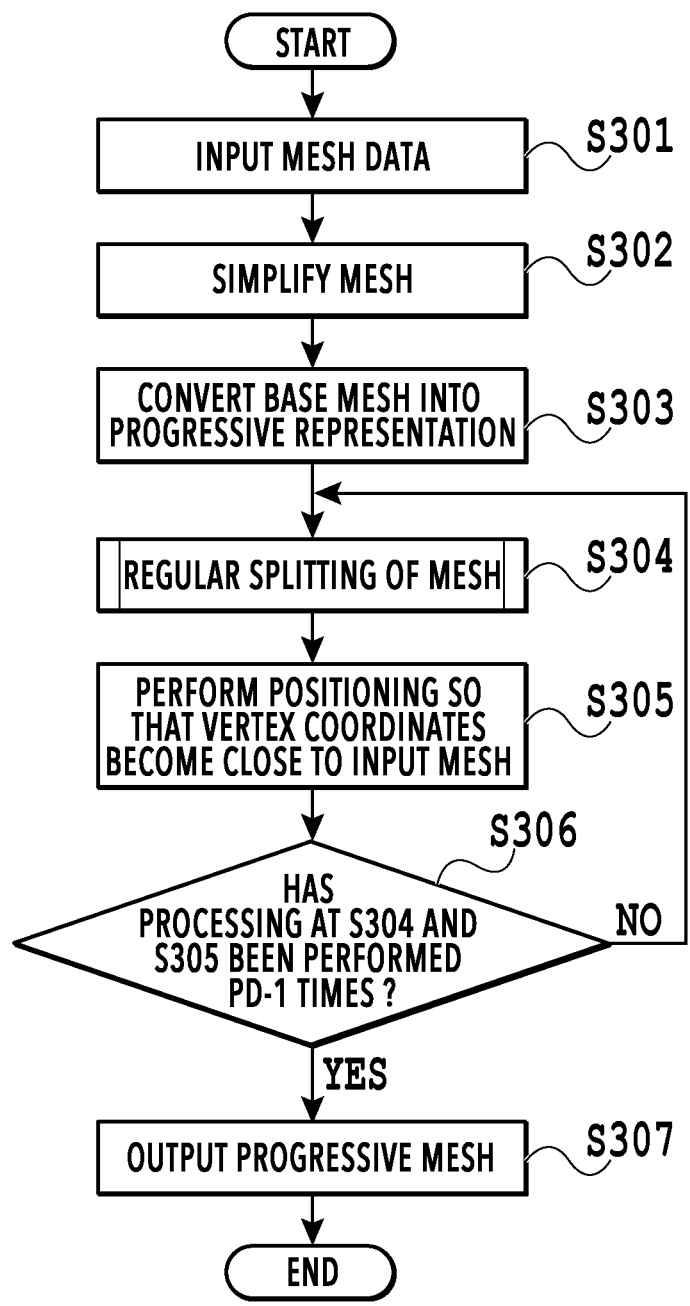
FIG. 3A and FIG. 3B are each a flowchart showing an outline and a procedure of processing performed in the encoding unit of the progressive encoding apparatus.

Next, the outline and the procedure of processing performed in the encoding unit of the progressive encoding apparatus shown in FIG. 2A are explained by using the flowchart in FIG. 3A. It is assumed that symbol "S" in explanation of the flowchart represents a step. Further, it is assumed that this point is also true in explanation of subsequent flowcharts.

At S301, the mesh input unit 201 inputs mesh data into the progressive encoding apparatus. At S302, the mesh simplification unit 202 simplifies a mesh in the input mesh data and approximately represents a mesh in the input mesh data by a mesh whose number of faces is smaller (that is, base mesh). For simplification of a mesh, in the present embodiment, the method disclosed in Japanese Patent Laid-Open No. 2007-265459 described above is used, but the method is not necessarily limited to this method and any method may be used as long as the method is capable of reducing the number of faces in a state where the structure of the shape is kept. As another method of simplifying a mesh, it is also possible to use a method in which an error (quadric error metrics) in a case where the structure of the faces around an edge indicating a connection relationship between vertices on a mesh is represented by a 4×4 matrix and in a case where a vertex is lost is calculated and an edge that minimizes the error is selected, and vertices are deleted one by one by integrating the vertices at both edge ends. Further, it may also be possible to simplify a mesh by representing the mesh by Graph Laplacian (sparse matrix representing topology) and converting the mesh into a degenerate matrix.

At S303, the topology conversion unit 203 converts the base mesh into a progressive representation. Here, the number of levels of resolution at the time of conversion into a progressive representation is referred to as PD (Progressive Depth). For example, in a case where PD=3, splitting is performed twice from the base mesh and between the base mesh in the first hierarchy and the full mesh in the third hierarchy, an intermediate mesh in the second hierarchy exists. The resolution of the intermediate mesh is higher than that of the base mesh and the resolution of the full mesh is higher than that of the intermediate mesh.

At S304, the topology splitting unit 205 performs a regular splitting of the mesh. The regular splitting of the mesh will be described later by using FIG. 5A to FIG. 5D. Further, in the regular splitting, only the number of faces and the number of vertices increase, but the shape does not change, and therefore, at S305, the geometry calculation unit 206 performs positioning so that the vertex coordinates become close to the input mesh. Here, the vertex of the input mesh, which is closer to the vertex for which positioning is performed, is searched for and the coordinates of the vertex for which the positioning is performed are caused to coincide with the coordinates of the vertex that is searched for. In addition, it may also be possible to perform positioning as energy minimization problem of minimizing the difference from the input mesh and the method is arbitrary.

Figure 5A:
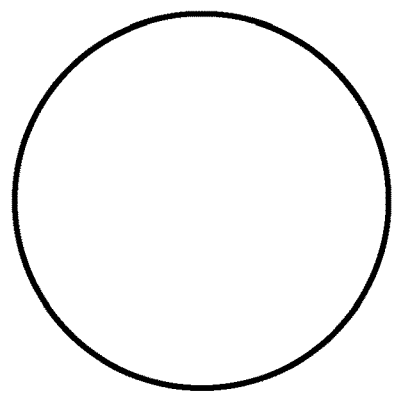
FIG. 5A to FIG. 5D are diagrams showing the way a mesh changes by splitting of a base mesh and fitting to an input mesh.
Figure 5B:
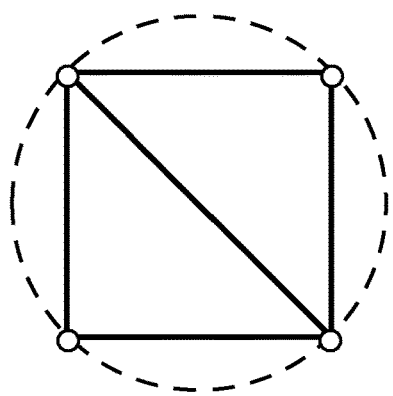
Figure 5C:
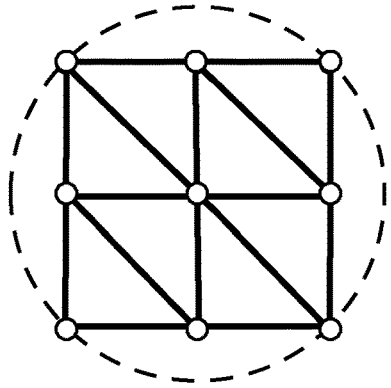
Figure 5D:
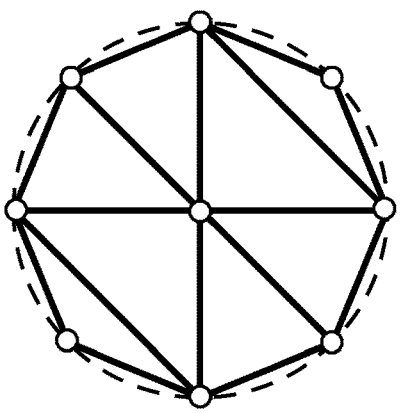

Here, as a supplement, the way the mesh changes by the series of processing at S302 to S305 is explained by using FIG. 5A to FIG. 5D. FIG. 5A is an input mesh, an ideal shape that is desired to be represented, and it is assumed that the input mesh is formed by a number of minute triangles, not shown schematically. By simplifying the mesh at S302 by taking the mesh shown in FIG. 5A as the input mesh, the mesh is approximately represented by two triangles as shown in FIG. 5B. Then, by performing the regular splitting of the mesh at S304, each triangle is divided into four triangles as shown in FIG. 5C. Lastly, by performing positioning of the vertices at S305, the shape of the mesh is caused to become close to the input mesh as shown in FIG. 5D.

At S306, the mesh splitting unit 204 determines whether or not the processing at S304 and S305 described above has been performed repeatedly PD-1 times. It is possible for the mesh splitting unit 204 to generate a progressively represented mesh (that is, full mesh) whose number of levels of resolution is PD by performing the processing at S304 and S305 described above PD-1 times (Yes at S306). The progressive mesh data that is output by the mesh output unit 207 at S307 includes at least topology data relating to the topology of the base mesh and geometry data relating to the geometry of the full mesh.

Figures 4A, 4B, 4C, 4D:
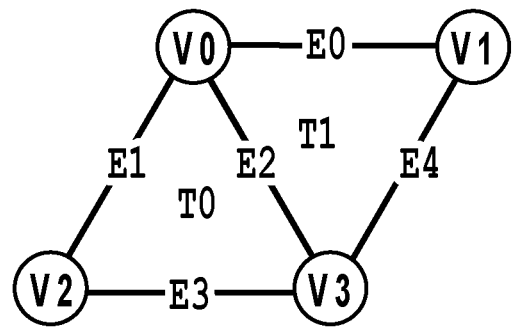
FIG. 4A to FIG. 4D are diagrams showing mesh data described in a progressive format.

Next, the data description format of a progressively represented mesh is explained by using FIG. 4A to FIG. 4D. FIG. 4A shows the outline of the data description format of a mesh and the mesh data is configured so as to include vertices indicated by V ($V_0$, $V_1$, $V_2$, $V_3$), edges indicated by E ($E_0$, $E_1$, $E_2$, $E_3$, $E_4$), and triangles indicated by T ($T_0$, $T_1$). FIG. 4B describes vertex coordinates, the same as in FIG. 1B.

FIG. 4C describes edges indicating a connection relationship between vertices on the mesh and here, describes a reference to the vertices at both edge ends. Further, FIG. 4C describes the reference to the vertices in the order from the vertex whose priority is low (whose number is small) among the priorities (numbers) of the vertices shown in FIG. 4B (that is, the vertex whose priority is low is described early). It may also be possible to describe the reference to the vertexes in the order from the vertex whose priority is high (whose number is large).

FIG. 4D describes the mesh of the triangle, which is the constituent unit of the mesh, and here, describes a reference to three edges configuring the triangle. The reference to the edges is described in the order of, by taking the vertex whose priority is the lowest among the priorities of the vertexes configuring the triangle as the base point, the edge to the right of the direction toward the opposite side, the edge to the left, and the edge on the opposite side. As a supplement, this order is only required to be capable of uniquely representing the surface direction of the triangle by the edge description order and the edges may be described in another order, such as the reverse order and the shifted order. Hereinafter, this data description format is referred to as the progressive format.

Figure 8:
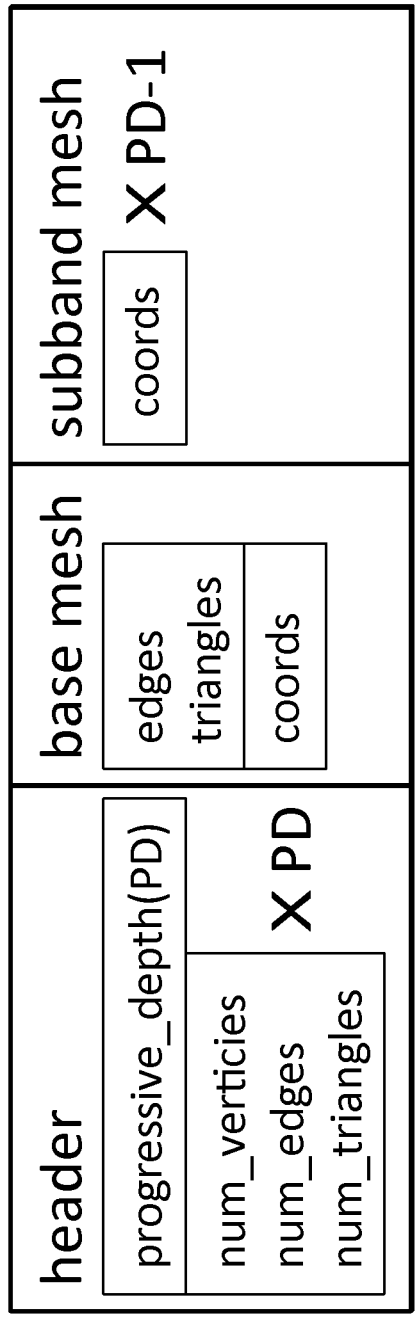
FIG. 8 is a diagram showing a configuration of a file that is output from a mesh output unit of the encoding unit of the progressive encoding apparatus.

Next, the configuration of the file that is output from the mesh output unit 207 of the encoding unit of the progressive encoding apparatus is explained by using FIG. 8. As shown in FIG. 8, the file that is output includes a header area, a base mesh area, and a subband mesh area. In the header area, the number of levels of resolution (progressive_depth), the number of vertices of the mesh in each hierarchy (num_vertices), the number of edges (num_edges), and the number of triangles (num_triangles) are described.

In the base mesh area, the edges edges, the triangles triangles, and the vertex coordinates coords of the base mesh are described. In the subband mesh area, additional detailed information that is necessary in the hierarchy whose resolution is higher than that of the base mesh is described and here, the vertex coordinates coords of the vertices newly generated by the splitting processing from the hierarchy whose resolution is low in each hierarchy are described. That is, note that the number of vertices described in the header area and the number of vertices described in the subband mesh area are different in the same hierarchy.

Figure 3B:
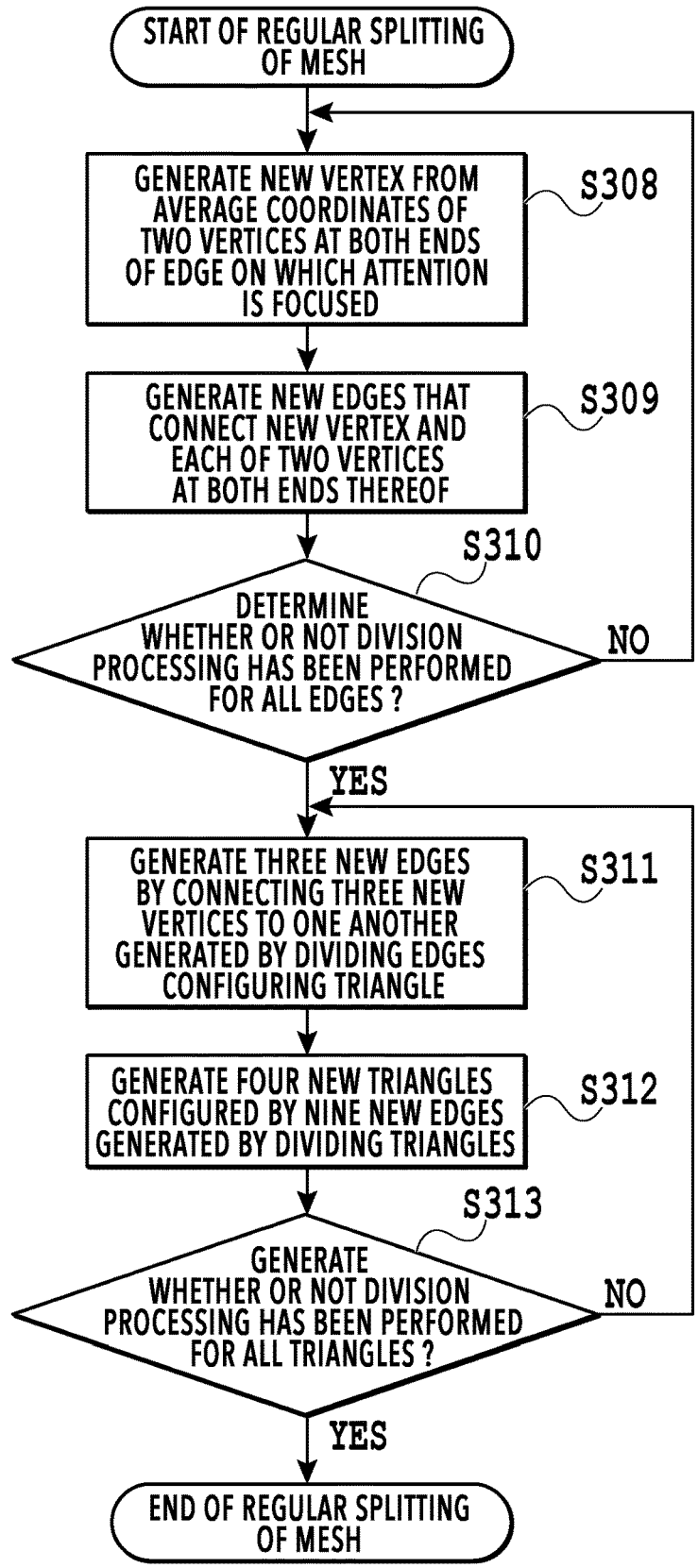
Figure 6A:
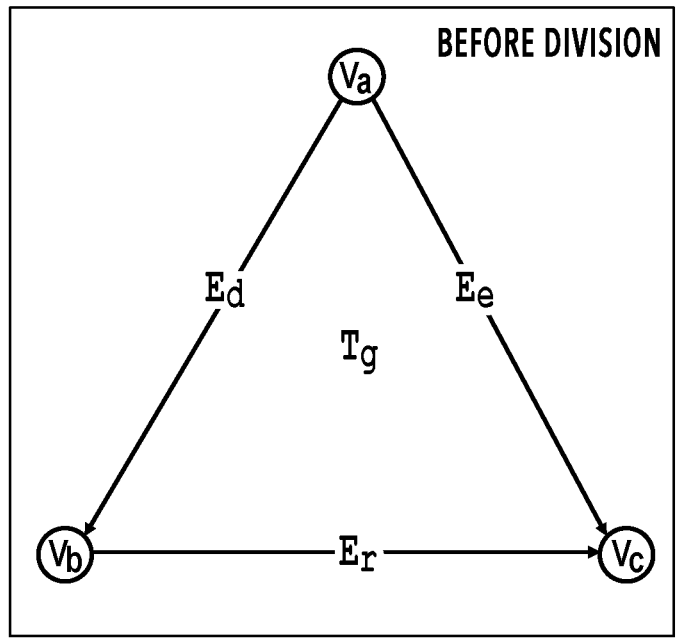
FIG. 6A is a diagram showing a change in mesh data described in the progressive format before splitting.
Figure 6B:
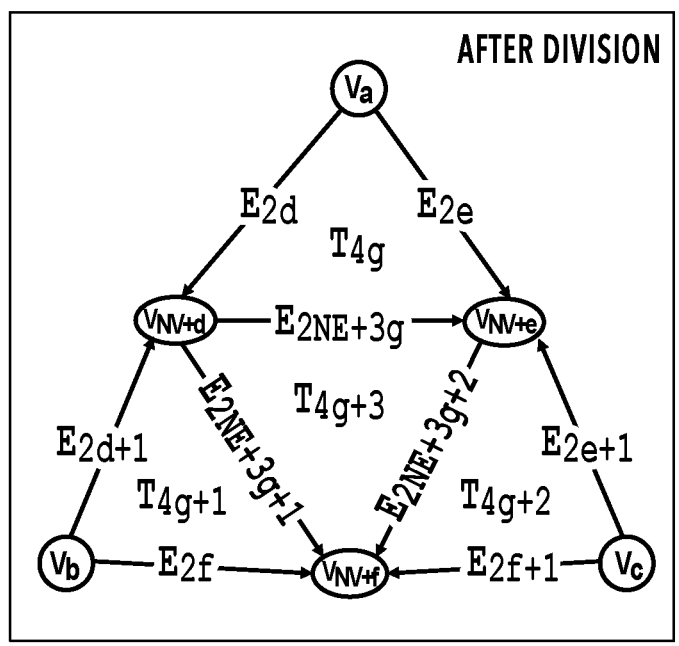
FIG. 6B is a diagram showing a change in mesh data described in the progressive format after splitting.
Figure 7:
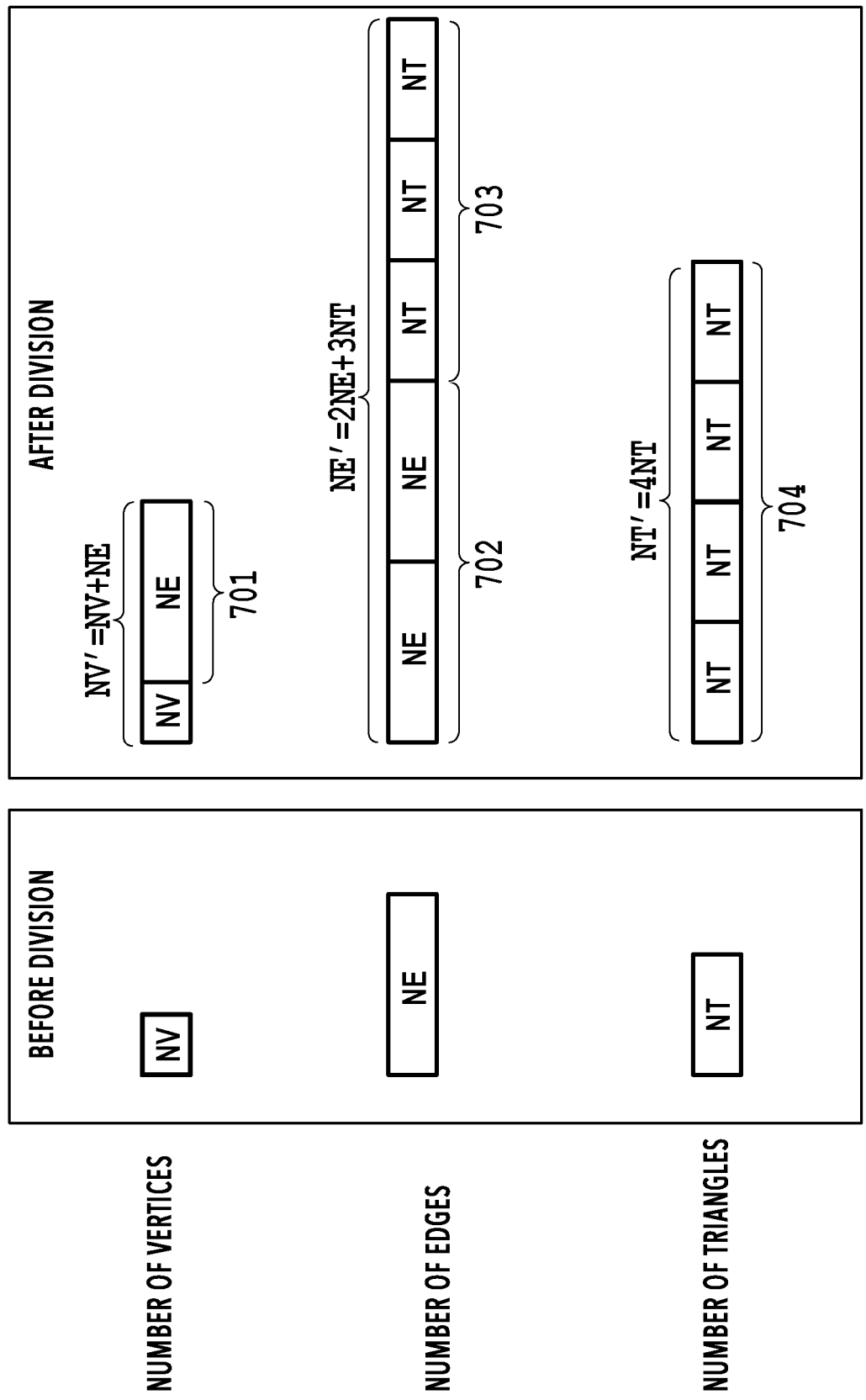
FIG. 7 is a diagram showing a variation in the number of elements before and after splitting.

Following the above, by using the flowchart in FIG. 3B, the regular splitting processing of the progressive mesh described above is explained. Here, it is assumed that the number of vertices of the mesh before splitting (division) is NV, the number of edges is NE, the number of triangles is NT, and in the following, the reference number of each element is indicated by (n). As for the vertex, the vertex after division also makes use of the vertex before division, and therefore, the reference number is maintained before and after division, but as for the edge and the triangle, an independent (unique) reference number is assigned before and after division. FIG. 6A and FIG. 6B show a change in mesh data described in the progressive format before and after splitting (that is, a relationship between the reference numbers of the vertex V, the edge E, and the triangle T) and FIG. 7 shows the variation in each number of elements before and after splitting.

At S308, the topology splitting unit 205 takes the edge on which attention is focused as, for example, Ed and generates a new vertex $V_{NV+d}$, which is the average coordinates of two vertices ($V_a$, $V_b$) at both ends of the edge Ed. At S309, the topology splitting unit 205 generates edges $E_{2d}$ and $E_{2d+1}$ as new edges, which connect the new vertex generated by division and each of the two vertices at both ends thereof. At S310, the topology splitting unit 205 determines whether or not the splitting processing has been performed for all the edges.

As described above, at S308 to S310, the topology splitting unit 205 performs the division processing by focusing attention on the edges before division one by one in order. Further, to supplement this by using FIG. 13A to FIG. 13C, the relationship will be as that shown in FIG. 13A and FIG. 13B. That is, the topology splitting unit 205 generates new vertices $V_{NV+0}$, $V_{NV+1}$, and $V_{NV+2}$ from an edge $E_0$, an edge $E_1$, and an edge $E_2$ and further generates new edges $E_{20}$ and $E_{20+1}$, new edges $E_{21}$ and $E_{21+1}$, and new edges $E_{22}$ and $E_{22+1}$.

At S311, the topology splitting unit 205 connects three new vertices $V_{NV+d}$, $V_{NV+e}$, and $V_{NV+f}$ to one another, which are generated by dividing edges Ed, Ee, and Ef configuring a triangle Tg. By doing so, the topology splitting unit 205 generates three new edges $E_{2NE+3g}$, $E_{2NE+3g+1}$, and $E_{2NE+3g+2}$. At S312, the topology splitting unit 205 generates (defines) four new triangles $T_{4g}$ to $T_{4g+3}$ configured by nine new edges $E_{2d}$, $E_{2d+1}$, $E_{2e}$, $E_{2e+1}$, $E_{2f}$, $E_{2f+1}$, and $E_{2+3g}$ to $E_{2NE+3g+2}$, which are generated by dividing the triangle Tg. At S313, the topology splitting unit 205 determines whether or not the division processing has been performed for all the triangles.

As described above, at S311 to S313, new edges are generated and further, new triangles are defined (generated). Further, to supplement this by using FIG. 13A to FIG. 13C, as indicated by the relationship in FIG. 13B and FIG. 13C, by connecting the new vertices $V_{NV+0}$, $V_{NV+1}$, and $V_{NV+2}$ to one another, which are generated in FIG. 13B, as shown in FIG. 13C, four new triangles are generated (defined). Due to this, topology (that is, information representing the connection relationship between each element) is generated.

In addition, FIG. 7 shows the variation in the number of elements of the vertex, the edge, and the triangle before and after splitting. In FIG. 7, the new vertex generated at S308 is described in an area indicated by symbol 701, the new edges generated at S309 are described in an area indicated by symbol 702, the new edges generated at S311 are described in an area indicated by symbol 703, and the new triangles generated at S312 are described in an area indicated by symbol 704.

Next, the decoding unit shown in FIG. 2B is explained. The decoding unit decodes the progressive mesh data generated by the encoding unit in FIG. 2A and acquires a mesh with a desired resolution (mesh in a set hierarchy). For example, in a case of specifying the mesh in the second hierarchy as the number of levels of resolution for the progressive mesh data generated with PD (number of levels of resolution)=3, the decoding unit acquires a mesh having the number of faces four times that of the base mesh. In the present embodiment, the specifications are such that only the mesh in the hierarchy set at the time of decoding is output, but it may also be possible to output the topology in all the hierarchies acquired during the decoding process.

As shown in FIG. 2B, the decoding unit comprises a mesh input unit 208, a topology storage unit 209, a topology splitting unit 210, a geometry storage unit 211, a geometry acquisition unit 212, a mesh restoration unit 213, and a mesh output unit 214.

The mesh input unit 208 inputs the progressive mesh data into the progressive encoding apparatus, stores (sets) the topology in (to) the topology storage unit 209, and stores the vertex coordinate information in the geometry storage unit 211.

The topology splitting unit 210 segments the topology stored in the topology storage unit 209 and generates topology of the mesh in the set hierarchy. The geometry acquisition unit 212 acquires a portion (vertex coordinate data) necessary for the set hierarchy among the vertex coordinates stored in the geometry storage unit 211.

The mesh restoration unit 213 acquires a representation of the mesh in the set hierarchy along with the vertex coordinate data acquired from the geometry acquisition unit 212 as well as acquiring the topology in the existing data description format by converting the topology of the segmented mesh. The mesh output unit 214 outputs the generated mesh.

Figure 9A:
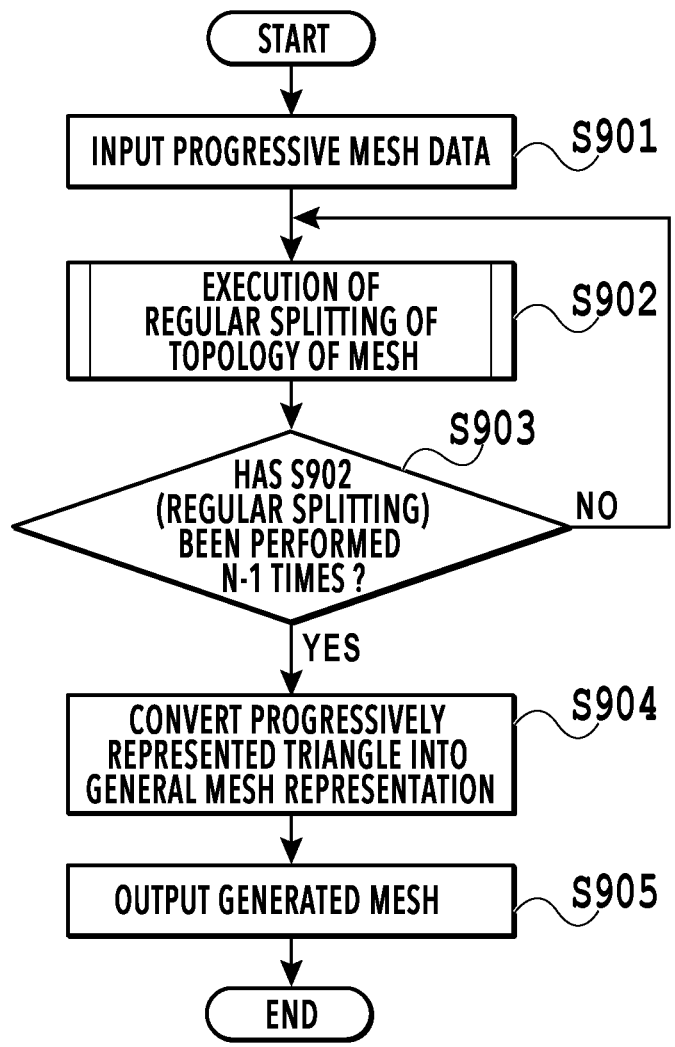
FIG. 9A and FIG. 9B are each a flowchart showing an outline and a procedure of processing performed in the decoding unit of the progressive encoding apparatus.

Next, the outline and the procedure of the processing performed in the decoding unit of the progressive encoding apparatus shown in FIG. 2B are explained by using the flowchart in FIG. 9A. At S901, the mesh input unit 208 inputs progressive mesh data into the progressive encoding apparatus.

At S902, the topology splitting unit 210 performs the regular splitting of the base mesh. At S903, the topology splitting unit 210 determines whether or not the regular splitting at S902 has been performed N-1 times in a case where a mesh whose number of levels of resolution is N hierarchies is acquired.

At S904, the mesh restoration unit 213 converts the progressively represented triangle into mesh data in the existing mesh representation (that is, mesh data in the existing data description format). In this case, by following the data description format in FIG. 4B to FIG. 4D described above (that is, the description order of reference to edges in the triangle, the description order of reference to vertices on the edge), it is possible to obtain the vertex without erroneously confusing the surface of the mesh with the backside. Specifically, for example, it is sufficient to take out the vertex described firstly on the edge described firstly, the vertex described secondly on the edge described firstly, and the vertex described secondly on the edge described secondly. At S905, the mesh output unit 214 outputs the generated mesh.

Figure 9B:
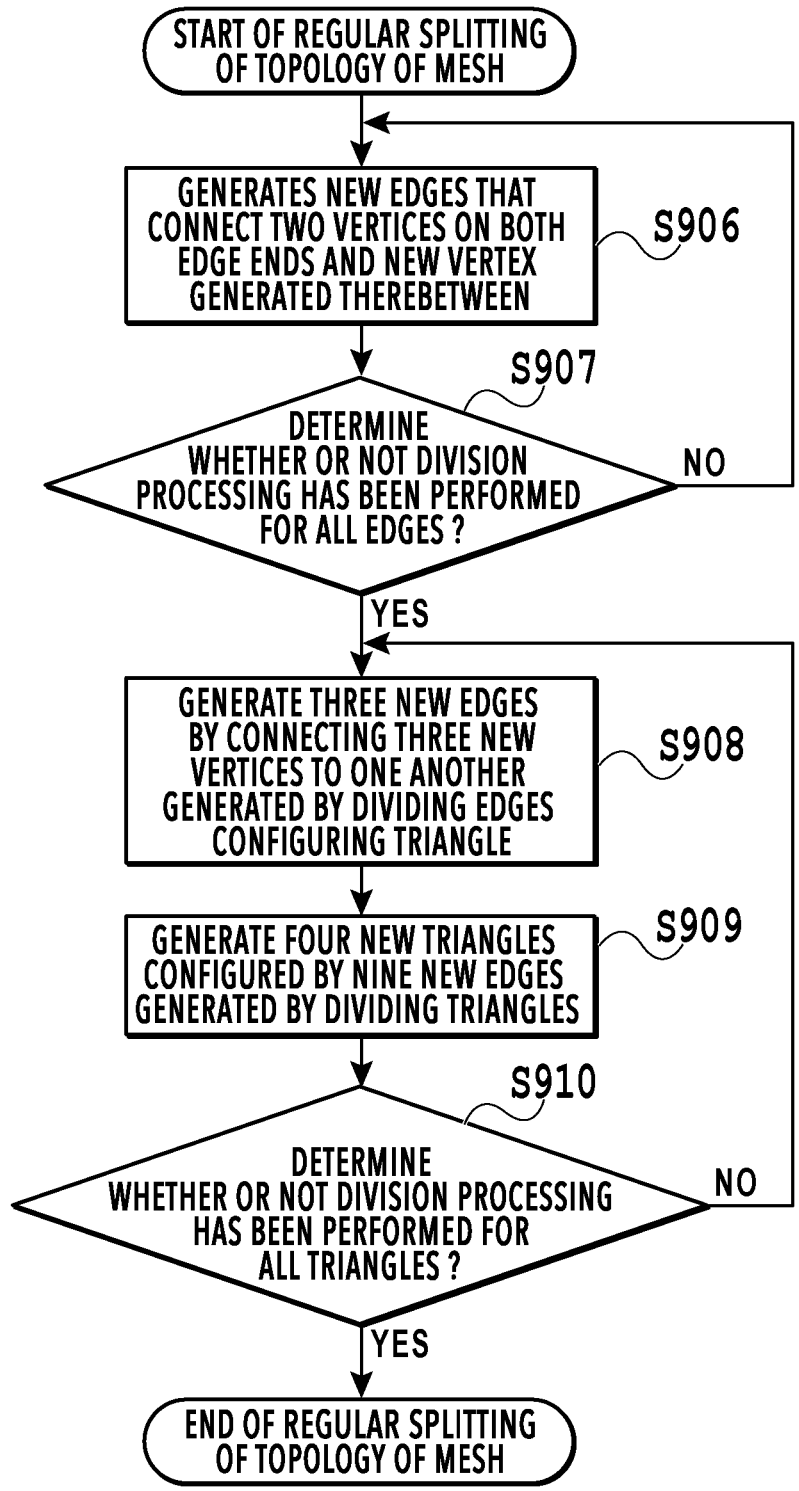

Following the above, by using the flowchart in FIG. 9B, the topology regular splitting processing of a base mesh, which is performed at S902, is explained. In FIG. 9B, the point changed from FIG. 3B described above is that S308 in FIG. 3B is not performed (that is, in FIG. 9B, calculation of vertex coordinates is not performed but input vertex coordinate information is made use of).

With the configuration described above, by managing the topology of a mesh by the edge, the generation rule of the topology that is generated in the high hierarchy is simplified, and therefore, it is possible to implement progressive encoding of a three-dimensional mesh that can be decoded at a high speed. It is also possible to similarly apply the contents explained in the present embodiment to a two-dimensional mesh.

Figure 10:
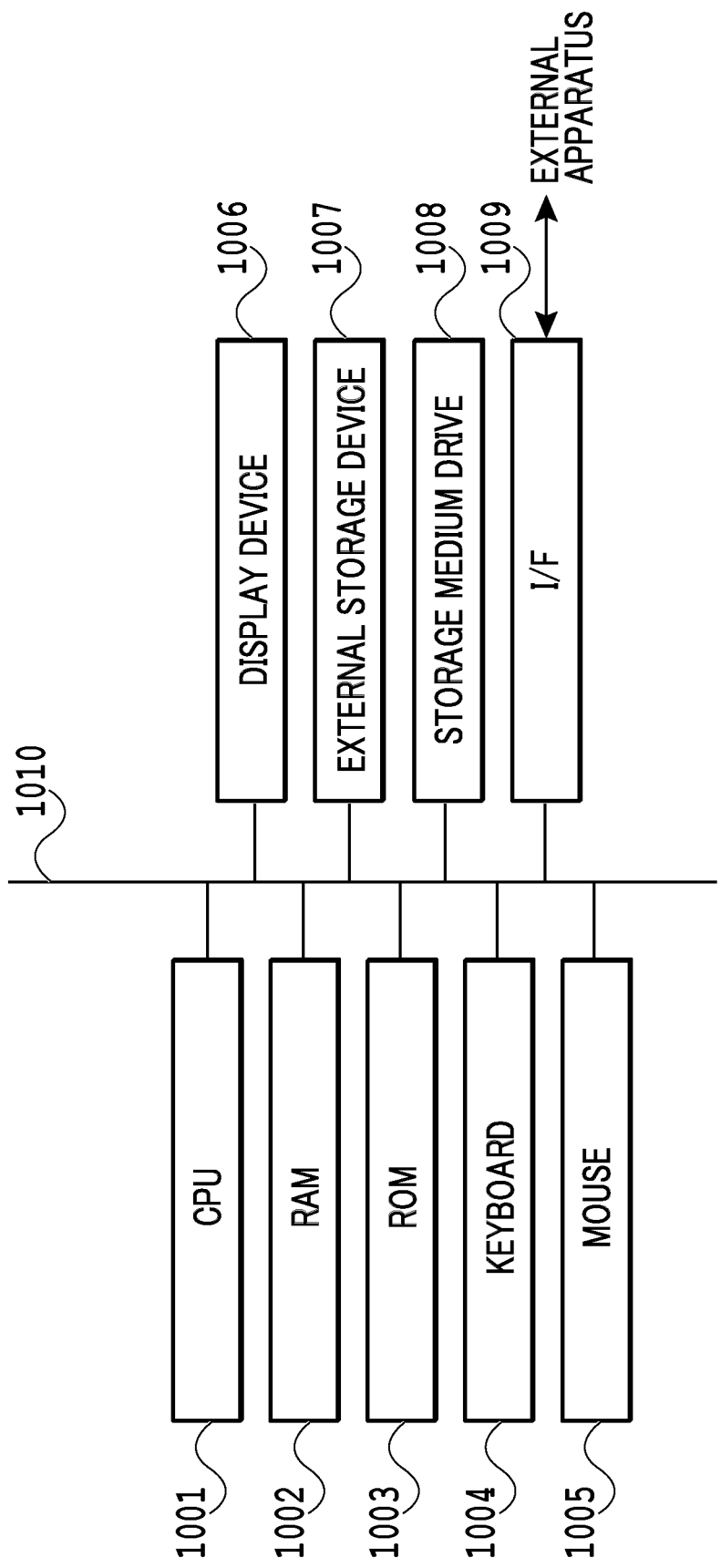
FIG. 10 is a diagram showing a hardware configuration of an encoding apparatus.
Figure 11A:
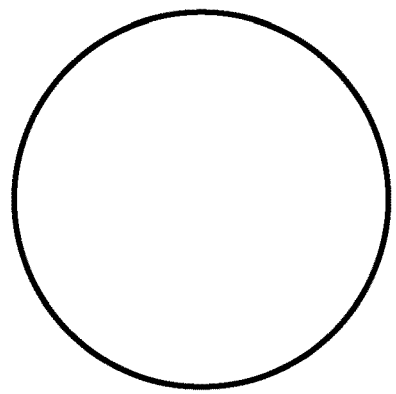
FIG. 11A to FIG. 11D are diagrams showing the way a mesh changes by splitting of a base mesh and fitting to an input mesh.
Figure 11B:
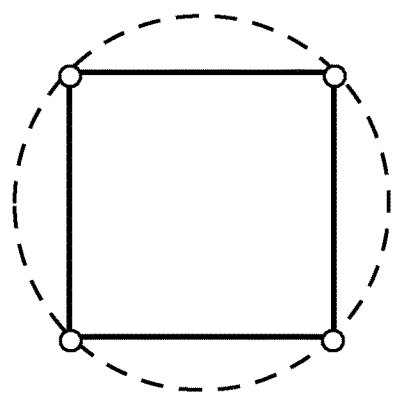
Figure 11C:
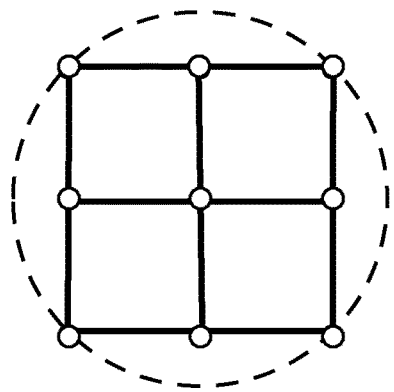
Figure 11D:
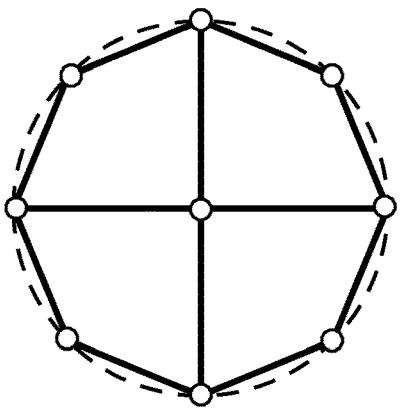

FIG. 10 is a diagram showing the hardware configuration of the encoding apparatus. The encoding apparatus according to the present embodiment comprises a CPU 1001, a RAM 1002, a ROM 1003, a keyboard 1004, a mouse 1005, a display device 1006, an external storage device 1007, a storage medium drive 1008, and an I/F 1009.

The CPU (Central Processing Unit) 1001 performs control of the entire computer by using computer programs or data stored in the RAM 1002 or the ROM 1003. Further, the CPU 1001 performs each piece of processing described above, which is explained on the assumption that the processing is performed by the encoding apparatus. The RAM (Random Access Memory) 1002 is an example of the computer readable storage medium. The RAM 1002 comprises a storage area for temporarily storing computer programs or data loaded from the external storage device 1007, the storage medium drive 1008, or the network I/F (interface) 1009. Further, the RAM 1002 comprises a work area used by the CPU 1001 in a case where the CPU 1001 performs various kinds of processing. That is, it is possible for the RAM 1002 to appropriately provide various areas. The ROM (Read Only Memory) 1003 is an example of the computer readable storage medium and stores, for example, setting data of the computer, a boot program, and the like.

The CPU 1001 of the encoding apparatus according to the present embodiment implements part of the functions of the blocks shown in FIG. 2A and FIG. 2B. That is, the CPU 1001 implements the functions of the mesh simplification unit 202, the topology conversion unit 203, the mesh splitting unit 204, the topology splitting unit 210, the geometry acquisition unit 212, and the mesh restoration unit 213 as part of the blocks shown in FIG. 2A and FIG. 2B. Further, it is possible to mount part of the blocks shown in FIG. 2A and FIG. 2B described above as software (computer programs) executed by the CPU 1001 by the CPU 1001 executing programs loaded onto the RAM 1002. In this case, the software is installed in the RAM 1002 of a computer, such as a PC (Personal Computer). Then, by the CPU 1001 of the computer executing the installed software, the computer implements the functions of the encoding apparatus described above.

It may also be possible to comprise one piece or a plurality of pieces of dedicated hardware different from the CPU 1001 or a GPU (Graphics Processing Unit) and for the dedicated hardware or the GPU to perform at least part of the processing by the CPU 1001. As the dedicated hardware, for example, there are an ASIC (Application Specific Integrated Circuit), an FPGA (Field-Programmable Gate Array), a DSP (Digital Signal Processor), and the like. In addition, as a supplement, the topology storage unit 209 and the geometry storage unit 211 in FIG. 2B correspond to, for example, the RAM 1002, the external storage device 1007, and the like.

The keyboard 1004 and the mouse 1005 are operated by an operator of the computer and by using those, it is possible to input various instructions and data to the CPU 1001. The display device 1006 is configured by a CRT, a liquid crystal screen, or the like and capable of displaying processing results by the CPU 1001 by images, characters, and the like.

The external storage device 1007 is an example of the computer readable storage medium and a large-capacity information storage device represented by the hard disk drive device. In the external storage apparatus 1007, for example, the OS (Operating System), computer programs and data for causing the CPU 1001 to implement each piece of processing shown in FIG. 3A and FIG. 3B, the various tables described above, the database, and the like are stored. The computer programs and data stored in the external storage device 1007 are appropriately loaded onto the RAM 1002 in accordance with the control by the CPU 1001.

The storage medium drive 1008 reads computer programs and data stored in the storage medium, such as CD-ROM and DVD-ROM, and outputs the read computer programs and data to the RAM 1002 and the external storage device 1007. It may also be possible to store part or all of the information explained as being stored in the external storage device 1007 in the storage device described above, such as CD-ROM and DVD-ROM, and cause the storage medium drive 1008 to read the information.

The network I/F 1009 is an interface for inputting the vertex index and the like from the external device, outputting encoded data to the external device, and so on, and is, for example, USB (Universal Serial Bus). A bus 1010 is a bus that connects each unit within the progressive encoding apparatus.

In the hardware configuration as described above, in a case where the power source of the computer is turned on, the CPU 1001 loads the OS onto the RAM 1002 from the external storage device 1007 in accordance with the boot program stored in the ROM 1003. As a result of this, it is made possible to perform the input operation via the keyboard 1004 and the mouse 1005 and further, it is made possible to display GUI (Graphical User Interface) on the display device 1006. Furthermore, in a case where a user operates the mouse 1005 or the like and gives instructions to activate the texture mapping application stored in the external storage device 1007, the CPU 1001 loads the texture mapping application onto the RAM 1002 and performs various kinds of processing. Due to this, the above-described computer functions as the encoding apparatus.

The progressive encoding application program executed by the CPU 1001 comprises functions corresponding to the mesh simplification unit 202, the mesh splitting unit 204, the topology splitting unit 210, and the mesh restoration unit 213. Further, the processing results here are saved in the external storage device 1007. As above, it is possible to apply the above-described computer to the encoding apparatus according to the present embodiment.

In the above-described embodiment, the method is explained in which based on the simplified base mesh, mesh data having a resolution higher than that of the base mesh is generated and then geometry data of the full mesh is generated, but the method is not limited to this. That is, for example, it may also be possible to acquire first the geometry data of the mesh data that is input and gradually reduce the resolution of the mesh data that is input and then generate the topology data of the mesh data (base mesh) whose resolution is lower than that of the input mesh data. In this case, it is sufficient to share information on which vertex the full mesh refers to and how to create the interpolated vertex with the progressive encoding apparatus. It may also be possible to transmit the information such as this from the progressive encoding apparatus to the progressive decoding apparatus or for the progressive decoding apparatus to save in advance the information.

Second Embodiment

In the above-described first embodiment, the example is explained in which the edge data is embedded within the data structure in a case of high-speed decoding. However, in the first embodiment, although it is possible to decode a mesh at a high speed, the number of edges is about three times the number of vertices and the number of elements is large, and therefore, there is a tendency for the data amount to become large as a result.

Consequently, in the present embodiment, a method is explained in which progressive encoding is implemented without embedding edge data within the data structure of the data to be output for the purpose of reducing the data amount. As for the encoding apparatus according to the present embodiment, it may also be possible to implement the function of each block, to be described later, by programs configured by a function group having the function of each block, like the encoding apparatus shown in FIG. 2A and FIG. 2B described above. Further, in the above-described first embodiment, the triangle mesh is explained as an example as the constituent unit of the mesh, but in the present embodiment, a rectangular mesh is explained as an example.

FIG. 12A and FIG. 12B are diagrams showing the function configuration of the progressive encoding apparatus. FIG. 12A shows the encoding unit and FIG. 12B shows the decoding unit. As shown in FIG. 12A, the encoding unit comprises a mesh input unit 1201, a mesh simplification unit 1202, a topology conversion unit 1203, a mesh splitting unit 1204, and a mesh output unit 1207. Further, the mesh splitting unit 1204 has a topology splitting unit 1205 and a geometry calculation unit 1206. Furthermore, as shown in FIG. 12B, the decoding unit comprises the following units. That is, a mesh input unit 1208, a topology storage unit 1209, a topology conversion unit 1210, a topology splitting unit 1211, a geometry storage unit 1212, a geometry acquisition unit 1213, a mesh restoration unit 1214, and a mesh output unit 1215.

In the following, explanation of the contents in common to those of the first embodiment is omitted and explanation is given by focusing attention mainly on portions different from the first embodiment. The mesh simplification unit 1202 of the encoding unit simplifies the mesh of the input mesh data and outputs the topology of the base mesh in the existing data description format, which is obtained thereby, to the mesh output unit 1207 as in the first embodiment. The mesh output unit 1207 outputs the topology of the base mesh in the general data description format, not the topology of the mesh represented progressively.

The mesh input unit 1208 of the decoding unit receives the base mesh in the existing data description format from the mesh output unit 1207 of the encoding unit. The mesh input unit 1208 stores the topology of the received base mesh in the topology storage unit 1209 and stores the geometry of the base mesh in the geometry storage unit 1212.

The topology conversion unit 1210 converts the topology of the base mesh into a progressive representation. Here, it is assumed that the input/output in the topology conversion unit 1210 coincide with the input/output in the topology conversion unit 1203. That is, in this manner, the base mesh is converted into a progressive representation in the decoding unit. After that, the topology splitting unit 1211 segments the topology of the base mesh converted into a progressive representation in the topology conversion unit 1210 and generates the topology of the mesh in the set hierarchy.

Further, in the present embodiment, as described above, the rectangular mesh is handled as the constituent unit of the mesh, and therefore, the process of mesh splitting is basically the same as that in FIG. 5A to FIG. 5D, but as shown in FIG. 11A to FIG. 11D, the topology is different from that in FIG. 5A to FIG. 5D. Specifically, different from the triangular mesh, in the rectangular mesh, the edges in FIG. 13D are divided into those as in FIG. 13E, which is the same as in the first embodiment, but different in that a new vertex is generated inside the rectangle as shown in FIG. 13F.

As above, in the present embodiment, the configuration is explained in which the topology of the base mesh in the existing data description format is output and progressive encoding is implemented. By this configuration, it is possible for the encoding apparatus according to the present embodiment to reduce the data amount necessary for topology compared to that of the encoding apparatus according to the first embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to reduce the processing amount relating to decoding in a progressive encoding scheme that performs encoding so that the resolution of a polygon mesh can be decoded stepwise.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-010058, filed Jan. 24, 2019, which is hereby incorporated by reference wherein in its entirety.

What is claimed is:

1. An information processing apparatus comprising:
one or more memories storing instructions; and
one or more processors executing the instructions to:
obtain first mesh data representing a shape of an object and second mesh data representing the shape of the object, a number of polygons being a constituent unit of the second mesh data being greater than a number of polygons of the first mesh data;
generate third mesh data by performing division of a polygon being a constituent unit of the first mesh data into multiple polygons, the division being performed by dividing each edge forming a polygon being a constituent unit of the first mesh data into two edges, by generating a vertex connecting the two divided edges, by generating edges connecting the generated vertices to one another, and by modifying the generated vertices based on the second mesh data, a number of polygons being a constituent unit of the third mesh data being greater than the number of polygons of the obtained first mesh data and being less than the number of polygons of the obtained second mesh data; and
output first information for specifying positions of modified vertices forming the generated third mesh data and second information for specifying a connection relationship of vertices forming the first mesh data, the second information including information relating to edges of the first mesh data and information relating to polygons being constituent units of the first mesh data.

2. The information processing apparatus according to claim 1, wherein
the edge is defined by describing a reference to vertices at both ends of the edge and
the reference to vertices indicates an order of vertices in the first mesh data.

3. The information processing apparatus according to claim 1, wherein
the constituent unit of the first mesh data is a triangle.

4. The information processing apparatus according to claim 3, wherein
the constituent unit of the first mesh data is defined by describing a reference to edges in an order of an edge to the right of a direction toward an opposite side, an edge to the left, and an edge on the opposite side with a vertex whose order is low as a reference point among vertices configuring a triangle.

5. The information processing apparatus according to claim 3, wherein
the one or more processors further execute the instructions to generate the third mesh data based on the first mesh data and the second mesh data, by dividing each edge forming the triangle into two edges, by generating a vertex connecting the two divided edges, by modify the generated vertices based on the positions of vertices forming the second mesh data, by generating edges connecting the modified vertices to one another and by dividing the triangle into four triangles.

6. The information processing apparatus according to claim 1, wherein the third mesh data is generated by performing division of a triangle being the constituent unit of the first mesh data into four triangles, the division being performed by dividing each edge forming the triangle into two edges, by generating a vertex connecting the two divided edges, by generating edges connecting the generated vertices to one another, and by modifying the dividing the generated vertices based on the second mesh data.

7. The information processing apparatus according to claim 1, wherein
the first information includes information relating to positions in a three-dimensional space of vertices forming the third mesh data.

8. The information processing apparatus according to claim 1, wherein
a total number of vertices forming the third mesh data is larger than a total number of vertices forming the first mesh data.

9. The information processing apparatus according to claim 1, wherein
a part of vertices forming the third mesh data correspond to vertices forming the first mesh data.

10. The information processing apparatus according to claim 1, wherein the one or more processors further execute the instructions to generate the vertices forming third mesh data based on the positions of vertices forming the first mesh data and the positions of vertices forming the second mesh data.

11. An information processing apparatus comprising:
one or more memories storing instructions; and
one or more processors executing the instructions to:
obtain first mesh data representing a shape of an object, first information for specifying positions of vertices forming second mesh data, and second information for specifying a connection relationship between vertices forming the first mesh data, a number of polygons being a constituent unit of the second mesh data being greater than a number of polygons of the first mesh data and being less than a number of polygons of third mesh data, the second mesh data being generated based on the first mesh data and the third mesh data, by dividing each edge forming a polygon being a constituent unit of the first mesh data into two edges, by generating a vertex connecting the two divided edges, by generating edges connecting the generated vertices to one another, and by modifying the generated vertices based on the second mesh data, and the second information including information relating to edges of the first mesh data and information relating polygons being constituent units of the first mesh data; and
generate mesh data whose resolution is higher than a resolution of the first mesh data based on the first mesh data, the first information, and the second information.

12. An information processing method comprising:
obtaining first mesh data representing a shape of an object and second mesh data representing the shape of the object, a number of polygons being a constituent unit of the second mesh data being greater than a number of polygons of the first mesh data;
generating third mesh data by performing division of a polygon being a constituent unit of the first mesh data into multiple polygons, the division being performed by dividing each edge forming a polygon being a constituent unit of the first mesh data into two edges, by generating a vertex connecting the two divided edges, by generating edges connecting the generated vertices to one another, and by modifying the generated vertices based on the second mesh data, a number of polygons being a constituent unit of the third mesh data being greater than the number of polygons of the obtained first mesh data and being less than the number of polygons of the obtained second mesh data; and
outputting first information for specifying positions of modified vertices forming the generated third mesh data and second information for specifying a connection relationship of vertices forming the first mesh data, the second information including information relating to edges of the first mesh data and information relating to polygons being constituent units of the first mesh data.

13. An information processing method comprising:
obtaining first mesh data representing a shape of an object, first information for specifying positions of vertices forming second mesh data, and second information for specifying a connection relationship between vertices forming the first mesh data, a number of polygons being a constituent unit of the second mesh data being greater than a number of polygons of the first mesh data and being less than a number of polygons of third mesh data, the second mesh data being generated based on the first mesh data and the third mesh data, by dividing each edge forming a polygon being a constituent unit of the first mesh data into two edges, by generating a vertex connecting the two divided edges, by generating edges connecting the generated vertices to one another, and by modifying the generated vertices based on the second mesh data, and the second information including information relating to edges of the first mesh data and information relating polygons being constituent units of the first mesh data; and
generating mesh data whose resolution is higher than a resolution of the first mesh data based on the first mesh data, the first information, and the second information.

14. A non-transitory computer readable storage medium storing a program for causing a computer to function as an information processing apparatus, wherein the information processing apparatus comprises:
one or more memories storing instructions; and
one or more processors executing the instructions to:
obtain first mesh data representing a shape of an object and second mesh data representing the shape of the object, a number of polygons being a constituent unit of the second mesh data being greater than a number of polygons of the first mesh data;
generate third mesh data by performing division of a polygon being a constituent unit of the first mesh data into multiple polygons, the division being performed by dividing each edge forming a polygon being a constituent unit of the first mesh data into two edges, by generating a vertex connecting the two divided edges, by generating edges connecting the generated vertices to one another, and by modifying the generated vertices based on the second mesh data, a number of polygons being a constituent unit of the third mesh data being greater than the number of polygons of the obtained first mesh data and being less than the number of polygons of the obtained second mesh data; and
output first information for specifying positions of modified vertices forming the generated third mesh data and second information for specifying a connection relationship of vertices forming the first mesh data, the second information including information relating to edges of the first mesh data and information relating to polygons being constituent units of the first mesh data.

15. A non-transitory computer readable storage medium storing a program for causing a computer to function as an information processing apparatus, wherein the information processing apparatus comprises:
one or more memories storing instructions; and
one or more processors executing the instructions to:
obtain first mesh data representing a shape of an object, first information for specifying positions of vertices forming second mesh data, and second information for specifying a connection relationship between vertices forming the first mesh data, a number of polygons being a constituent unit of the second mesh data being greater than a number of polygons of the first mesh data and being less than a number of polygons of third mesh data, the second mesh data being generated based on the first mesh data and the third mesh data, by dividing each edge forming a polygon being a constituent unit of the first mesh data into two edges, by generating a vertex connecting the two divided edges, by generating edges connecting the generated vertices to one another, and by modifying the generated vertices based on the second mesh data, and the second information including information relating to edges of the first mesh data and information relating polygons being constituent units of the first mesh data; and
generate mesh data whose resolution is higher than a resolution of the first mesh data based on the first mesh data, the first information, and the second information.

\* \* \* \* \*